US005969960A

United States Patent [19]

Tachon et al.

[11] Patent Number: 5,969,960

[45] Date of Patent: Oct. 19, 1999

[54] ELECTRONIC CIRCUIT FOR CONVERTING ELECTRICAL ENERGY HAVING A CORRECTIVE, COLLECTIVE CONTROL MEANS

[75] Inventors: Olivier Tachon; Maurice Fadel; Thierry Meynard, all of Toulouse Cedex; Philippe Carrere, Paris, all of France

[73] Assignee: Alcatel, Paris, France

[21] Appl. No.: 08/998,806

[22] Filed: Dec. 29, 1997

[30] Foreign Application Priority Data

Dec. 30, 1996 [FR] France .................................. 96 16192

[51] Int. Cl.[6] ...................................................... H02M 3/18

[52] U.S. Cl. .............................................. 363/60; 307/110

[58] Field of Search ........................ 363/59, 60; 307/109, 307/110; 257/299

[56] References Cited

U.S. PATENT DOCUMENTS 5,345,376 9/1994 Nourbakhsh .............................. 363/62
5,668,711 9/1997 Lavieville et al. ......................... 363/62
5,706,188 1/1998 Meynard et al. .......................... 363/59

FOREIGN PATENT DOCUMENTS

0720280A1 7/1996 European Pat. Off. .
0720282A1 7/1996 European Pat. Off. .
0731554A1 9/1996 European Pat. Off. .

*Primary Examiner*—Shawn Riley
*Attorney, Agent, or Firm*—Sughrue, Mion, Zinn, Macpeak & Seas, PLLC

[57] ABSTRACT

A multilevel converter including, in particular, a voltage source, a current source, and a capacitor for each of its cells, and a controller. The controller evaluates any current difference between an observed current through the current source and a current requested by the current source. The controller also includes ON-time controller for taking into account the current difference, if any, and altering accordingly a duration of the first conduction state of all of the cells in the converter in a direction suitable for reducing the current difference. The controller also maintains all of the floating capacitors at their equilibrium voltage values.

7 Claims, 4 Drawing Sheets

VE
Cn
C2
C1
SC
CURRENT SOURCE
I
VIsc
MEASURE CURRENT DIFFERENCE
EVALUATE VOLTAGE
VM0n
VM02
VM01
VEn
Vcn
VE2
Vc2
VE1
Vc1
VI
Iref
Rn
R2
R1
VECn
VEC2
VEC1
MEASURE VOLTAGE DIFFERENCE
VEI
GECn
GEC2
GEC1
Gn
G2
G1
WEIGHT
G'n
G'2
G'1
GEx
GI
ALn
AL2
AL1
CONTROL
ON-TIME
GRCn+1
RCn+1
GRCn
GRC2
GRC1
RC3
RC2
RCn
RC1
GSn+1
Sdn+1
GSn
GS2
GS1
T
Sdn
Sd2
Sd1
DELAY
CONTROL THE CELLS
BT
TIME BASE
CTn+1
CTn
CT2
CT1

ELECTRONIC CIRCUIT FOR CONVERTING ELECTRICAL ENERGY HAVING A CORRECTIVE, COLLECTIVE CONTROL MEANS

The present invention relates to electronic circuits for converting electrical energy of the type described in French Patent Application FR 2 679 715 A1, and to a power supply installation making use thereof.

BACKGROUND OF THE INVENTION

The converter described in that patent application is shown, by way of example, in accompanying FIG. 1. It essentially comprises, between a voltage source SE and a current source C, a succession of controllable switching cells CL1, CL2, . . . , CLn+1, each having two switches T1, T'1; T2, T'2; . . . ; Tn+1, T'n+1, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell CL1 being connected to said current source C, while the pair of downstream poles of a last cell CLn+1 is connected to said voltage source SE, the converter also comprising a respective capacitor C1, C2, . . . , Cn+1 for each cell, except that the capacitor of the last cell may be omitted when said voltage source SE is suitable for performing the same role, each capacitor being connected between the two poles constituting the pair of downstream poles of its cell, the converter further having control means (not shown) governing the nominal operation of the converter and acting on the switches of the successive cells in such a manner that the two switches of any one cell are always in respective opposite conduction states (represented by control links such as lcl), such that in response to a cell control signal delivered by said control means, one of the two switches in a given cell is successively in a first conduction state and then in a second conduction state during a cyclically repeated converter period, and such that in response to cell control signals that are identical but offset in time by a fraction of said converter period, the switches of successive cells function respectively in the same manner but offset in time by said fraction of a period.

Preferably, said fraction of a period is equal to the reciprocal of the number n+1 of cells, i.e. $2\pi/n+1$, which is optimal with respect to harmonics generated on the output and which enables the voltages charged on the capacitors of the converter to be balanced naturally. Some other offset is nevertheless conceivable, as are different offsets between the various stages.

In such a converter, the successive capacitors C1, C2, . . . , Cn+1 have respective increasing mean charge voltages, the mean charge voltage of the capacitor associated with each of said cells being equal to the product of a voltage VE delivered by said voltage source SE multiplied by the reciprocal of the number of cells in the converter and by the rank of the cell, i.e. VE/3, 2VE/3, VE when n+1=3, i.e. when the converter has only three cells.

Naturally, the above applies to other values of n, providing n is not less than two, and in particular when n is greater than three.

The term "multilevel converter" is used below to designate a converter that satisfies the above description.

To examine more easily how the charge ought nominally to vary on one of the capacitors of a multilevel converter as described above, reference is made to FIG. 2 which shows an arbitrary switching cell CLk together with its switches Tk and T'k, the capacitor Ck associated with the cell, and also the following cell CLk+1 and its switches Tk+1, T'k+1.

Given the coupling between the switches within each cell, Tk and T'k or Tk+1 and T'k+1, the set of two imbricated cells CLk and CLk+1 shown in FIG. 2 has four states:

a) a first state where Tk and Tk+1 are non-conducting, so the charge voltage on Ck does not change;

b) a second state where Tk and Tk+1 are both conducting, so the charge voltage on Ck does not change either, since under those circumstances T'k and T'k+1 are non-conducting;

c) a third state where Tk is conducting and Tk+1 is non-conducting, in which case the current source C forces a current Ik which is equal to I to flow through Tk while the current I'k through T'k is zero. It is the state of Tk+1 that forces the current Ik+1 to be zero, while the current I'k+1 is equal to I so the current I'ck through the capacitor Ck is equal to I; and d) a fourth state where Tk is non-conducting and Tk+1 is conducting, so the current source C forces a current I'k equal to I through T'k while the current Ik through Tk is zero. The state of Tk+1 forces a current Ik+1 to be equal to I, while the current I'k+l is zero, so the current Ick through the capacitor Ck is equal to I.

The currents I'ck=I'k+1 and Ick=Ik+1 deliver additional charge of opposite signs to the capacitor Ck in the above third and fourth states; the first situation is said to be negative and the second positive. The currents corresponding to these two states are forced by the current source. If the current source forces an exactly accurate DC, and everything else remains equal, then the currents forced by the current source during stages c) and d) are the same and in opposite directions at all times throughout the conduction periods of Tk and Tk+1 (which are nominally equal and offset in time, as mentioned above). This means that the charge on Ck is changed negatively and then positively by equal amounts, so it does not vary over one period of the converter.

In an ideal system (accurate current source, infinite impedance), the currents Ick and I'ck are determined by the current source. In more practical terms, when the impedance of the current source is not infinite, the current through the current source depends on the voltage across its terminals and thus on the voltages Vck on the capacitors. For example, if it should happen that the charge voltage Vck is too high compared with its nominal value VE.k/n, for whatever reason, then there will result a discharging current I'ck tending to be greater and a charging current Ick tending to be smaller than they ought to be nominally, thereby tending to return the charge on the capacitor Ck to the value it ought to have. This explains that the operation of the multilevel converter is stable and can accommodate variations in amplitude, in either direction, both at the voltage source and at the current source. It is explained below that this nevertheless gives rise to problems in dynamic terms.

FIG. 3 is an example of operation of the multilevel converter of FIGS. 1 and 2 for a situation when it comprises three cells; pulse width modulation (PWM) type control is applied in order to deliver a sinusoidally modulated alternating voltage to the current source C, i.e., during successive periods p1, p2, p3, . . . in the operation of the converter (line t), the switches T1, T2, and T3 are successively conductive during time intervals that vary in accordance with a wave for modulating the output voltage, referred to below as the "modulating" wave. At each instant, the corresponding switches T'1, T'2, and T'3 are in the opposite positions.

Naturally, other modes of modulating the operation of the switches make it possible to obtain the same result, as is well known. Also clearly, the converter may also serve to deliver the current source C with any other waveform or with a regulated DC voltage.

Consideration is given initially to the period p1 in the operation of the converter. During this period, while any one of the switches T1, T2, and T3 is conducting, the other two are non-conducting. For each set of two cells and the capacitor between them, this corresponds to above-described states c) and d), in which the capacitor receives successive additional negative and positive charge, with the total value thereof being nominally zero. It should also be observed that while the imbricated cells CL1 and CL2 are in state d), imbricated cells CL2 and CL3 are in state c) such that capacitor C1 receives additional positive charge from the same current that provides additional negative charge to capacitor C2.

FIG. 3 also shows, by way of example, how the multilevel converter operates during periods p2, p3, etc. . . . , during which the conduction periods of the switches T1, T2, and T3 become shorter, and then become longer until they exceed one-third of a period, in which case they overlap. Line VI shows the voltage that would ideally be transmitted to the current source, in particular if the capacitance of the capacitors was such that the additional charge in question did not significantly alter the voltage across their terminals. The voltage VI is expressed in fractions of the voltage VE from the voltage source SE, taking the negative pole of the voltage source SE as the voltage reference. It can then be seen that this voltage VI contains both a large fundamental at the frequency of the modulating wave, and also lower-amplitude harmonics at frequencies higher than the chopper frequency which are easily eliminated by a low-pass filter. Since the current is variable, integrating it by means of an arbitrary inductive element contained in the current source results in the converter supplying the current source with an AC of sinusoidal appearance having a period that is equal to the period of the fundamental of the output voltage.

Since the current varies sinusoidally, states c) and d) mentioned above will not convey equal additional amounts of charge to the capacitors of the converter, since between the above two states, the current will have had time to vary. Such variation is negligible only if the operating period of the switches is significantly greater than the frequency of the modulating wave.

It should also be expected that the AC supplied to the current source will not be exactly sinusoidal, but will be distorted in an asymmetrical manner. Likewise, errors in the levels of the control signals or in the signals they generate, or indeed differences in the switching times of the various switches involved, inevitably cause switch conduction durations to be unequal over an operating period of the converter, or will shift the conduction stages of the switches in time, or else will unbalance the currents charging and discharging the capacitors. Consequently, and in general, it is not possible in practice with a multilevel converter of the type described to guarantee that nominal operating conditions as described initially will, in fact be satisfied. Unfortunately, a persistent error in additional charge will lead to an error in one direction or the other in the charge on a capacitor, and thus to an error in its mean charge voltage, thereby giving rise to distortion at the operating frequency of the converter in the voltage delivered to the current source.

This effect is illustrated by trace VI' in FIG. 3 which is similar to the trace VI with the exception that capacitor C1 (FIG. 1) which is assumed to be charged to a voltage that is smaller than its nominal charge voltage prevents the converter from delivering pulses vi1, vi2, vi3 of constant amplitude, with the converter supplying instead, pulses such as vi1' that are of smaller amplitude (the scale is exaggerated to make it more readable) whenever the capacitor C1 is delivering its own charge voltage to the current source C, and pulses such as vi2' of greater amplitude whenever the capacitor C1 is subtracting its own voltage from the voltage delivered to the current source C, and finally also pulses such vi3' of unchanged amplitude whenever the capacitor C1 is not in the circuit. It is thus easy to see that this introduces into the signal VI' a disturbing component at said chopper frequency of the converter.

Such a disturbing component does not exist when the capacitors are charged to their respective nominal voltages. When such a component appears, it is generally harmful.

However, and above all, the voltages to which the switches are subjected are no longer substantially equal to the differences between the nominal charge voltages of two adjacent capacitors, i.e. the voltage of the voltage source divided by the number of stages in the converter. This can put the switches in danger.

Naturally, and as mentioned above, errors in charge on the capacitors tend spontaneously to be reabsorbed, but that process takes time.

In addition, the spontaneous process is implemented via the current source. It therefore cannot have effect when the current source is not forcing a current, and in any event it will be slowed down whenever the current flowing through the current source is small.

French Patent Application No. 9502818 dated Mar. 10, 1995 therefore proposes a multilevel converter which, alongside the above-mentioned modulation control, includes means for measuring any difference on each of said capacitors between the evaluated mean charge voltage and the nominal mean charge voltage of the capacitor, and additional control means changing the duration of said first conduction state of the cell associated with said capacitor in a direction such that the measured voltage difference is reduced.

In an embodiment of that improved multilevel converter, each of said difference-measuring means includes means for receiving the value of the voltage of the voltage source, the rank of the stage and the number of stages, so as to determine what the nominal charge voltage of each capacitor consequently ought to be in an operating period of the converter, said difference then being measured on each capacitor of the converter by comparator means subtracting said mean voltage evaluated across the terminals of each capacitor from said nominal charge voltage of the capacitors.

It is possible to refer to that prior patent application in general to obtain numerous implementation details and explanations concerning operation of that multilevel converter that are not reproduced in the present application.

However, the above-mentioned measurements are intended to correct the charge differences of the capacitors of the converter with the capacitors being considered individually only. Unfortunately, as mentioned above, any corrective action taken on one of the values considered gives rise to actions on other values (the charges on the other capacitors, the voltage or the current at the output of the converter, etc.), which actions are undesirable, and in turn require corrective actions, and so on. The problem posed by this is further complicated by the fact that the corresponding response times are different and are not controlled.

OBJECTS AND SUMMARY OF THE INVENTION

An object of the present invention is therefore to address that problem by providing a solution that makes it possible to respond with time constants that are small and suited to requirements as regards correcting the variations of various characteristic values of converter operation. The invention also provides various ways of implementing this solution.

According to the invention, the multilevel converter includes collective control means for taking into account a combined set of weighted values, each of which relates to a characteristic value of operation of the converter, the combined set collectively controlling ON-time control means suitable for altering accordingly said duration of the first conduction state of all of the cells of the converter in a direction suitable for reaching a state of dynamic equilibrium.

A regulating loop is thus constituted matching the cyclic operation of all of the cells of the converter to the respective states of characteristic values of operation of the converter. The response time of the loop can be of the order of a few chopper periods of the converter.

In one embodiment, said collective control means include means for evaluating any current difference between an observed current through said source and a current assigned to said current source, said difference being included in said combined set.

Preferably, said combined set also takes into account the sum of said voltage differences, if there are any.

Since the voltage differences are evaluated on the basis of the voltage delivered by the voltage source, a second regulating loop is thus constituted associated with the first regulating loop, the second regulating loop matching cyclic operation of all of the cells to the voltage of the voltage source. The response time of the second loop is also of the order of a few chopper periods of the converter.

Preferably, said ON-time control means comprise an ON-time control circuit delivering a control signal to a cell control module which delivers a cell control signal by means of which it modulates accordingly said duration of the first conduction state of a first cell of the converter; in one embodiment, said cell is the cell adjacent to the voltage source.

Preferably, said ON-time control means comprise an ON-time control circuit for each of the cells following said first cell, and in that each of the ON-time control circuits is connected to a cell control module, and the ON-time control circuits are connected together in a manner such that the ON-time control circuit of a given cell receives the cell control signal of the cell preceding the given cell, and uses it, together with said voltage difference of the given cell, to generate the control signal for controlling the given cell.

Preferably, said current difference and/or said voltage differences can be weighted by an adjustable gain parameter, so as to perform decoupling between said characteristic values making up said combined set.

BRIEF DESCRIPTION OF THE DRAWINGS

The various objects and characteristics of the present invention appear more clearly in the following description of embodiments of the invention given by way of non-limiting example and with reference to the accompanying figures, in which.

MORE DETAILED DESCRIPTION

A multilevel converter is not described again. The diagrams of FIGS. 1, 2, and 3 correspond to a converter of the type described in Patent Document FR 2 697 715 A1, to which the reader can refer for more ample details.

Figure 1:
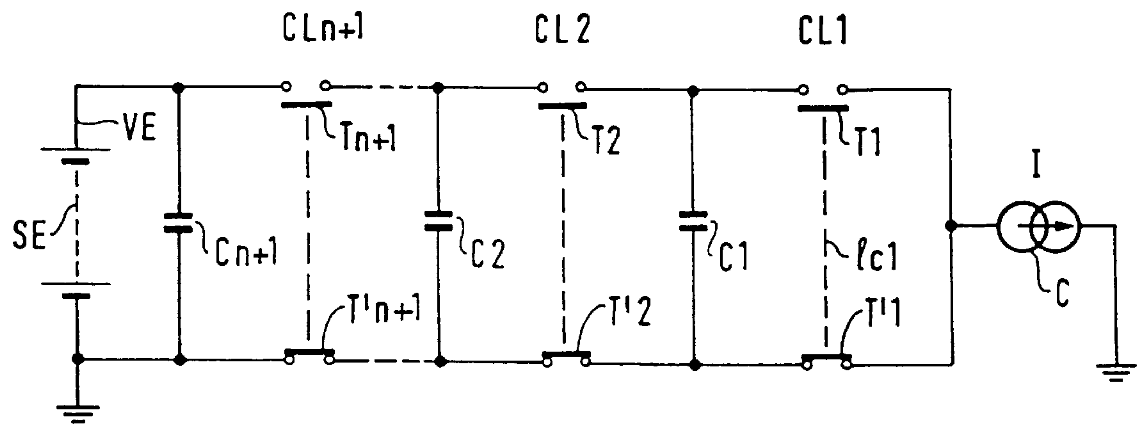
FIG. 1, described above, is the circuit diagram of a known multilevel converter.
Figure 4:
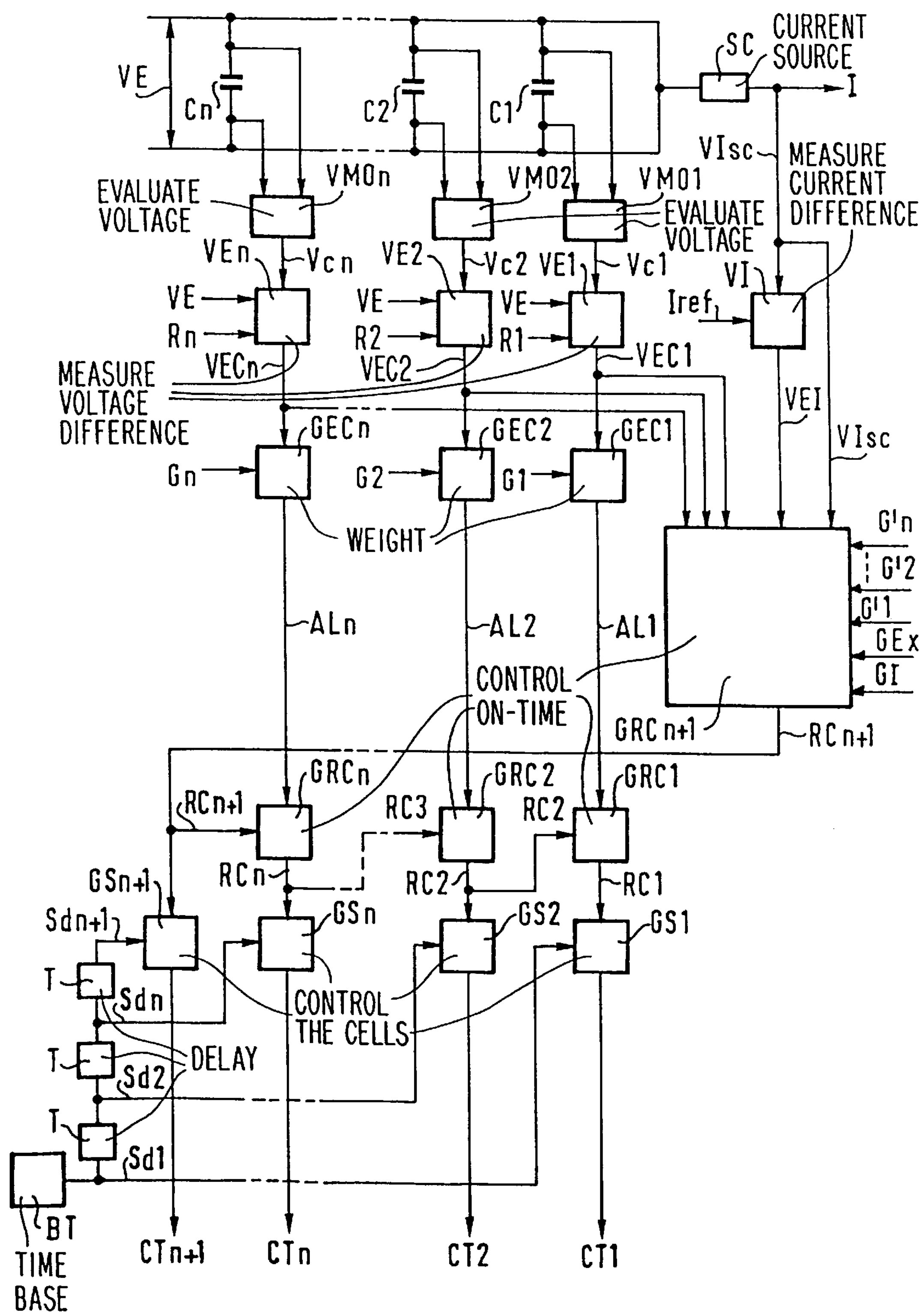
FIG. 4 is the circuit diagram of control means for a multilevel converter of the type shown in FIGS. 1, 2, and 3 and organized to enable the invention to be implemented.

FIG. 4 shows the set of means for controlling a converter similar to the converter shown in FIG. 1, but having n+1 switching cells, only n of which have their own capacitors C1, C2, Cn, the capacitor of a cell of rank n+1 coinciding with the power supply source, as envisaged above. Thus, in FIG. 4, only the capacitors C1, C2, . . . , Cn are shown, together with a current source SC, through which a current I passes.

Each of these capacitors is associated with a respective evaluation circuit VMO1, VMO2, . . . , VMOn enabling the voltage across the terminals of each of the capacitors to be evaluated. To this end, each such circuit is coupled to the two terminals of a respective capacitor, and provides an evaluation signal Vc1, Vc2, . . . , Vcn representative of the charge voltage that exists across the terminals of the capacitor.

Figure 5:
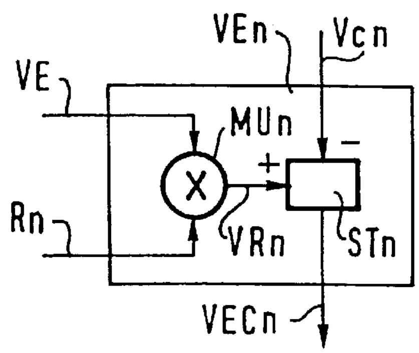
FIG. 5 shows an embodiment of the difference-measuring circuit VEn shown in FIG. 4.

Each of the capacitors is also associated with a respective difference-measuring circuit VE1, VE2, . . . , VEn measuring the difference, if any, between the observed charge voltage as received from the corresponding evaluation circuit and the nominal charge voltage of the capacitor. The difference-measuring circuit VEn is shown by way of example in FIG. 5. It receives a magnitude VE which is the value of the voltage delivered by the voltage source of the converter (see FIG. 1), and a constant Rn which is specific to each capacitor, and which can be generally expressed as follows: Rk=k/n+1, and in this example, n/n+1. A multiplier MUn delivers the product VRn of these two values, which is the nominal charge voltage of the capacitor Cn. A subtractor STn subtracts the observed charge voltage VCn from the nominal charge voltage VRn, and expresses any difference voltage in the form of a difference signal VECn. The other difference-measuring circuits are similar, with k taking respective integer values from n−1 to 1.

The difference signals generated in this way are collectively applied to collective control means organized to take into account a combined set of weighted values, each of which relates to a characteristic operating value of the converter. The collective control means include ON-time control means suitable for altering accordingly said duration of the first conduction state of all of the cells of the converter in a direction suitable for reaching a state of dynamic equilibrium.

Figure 6:
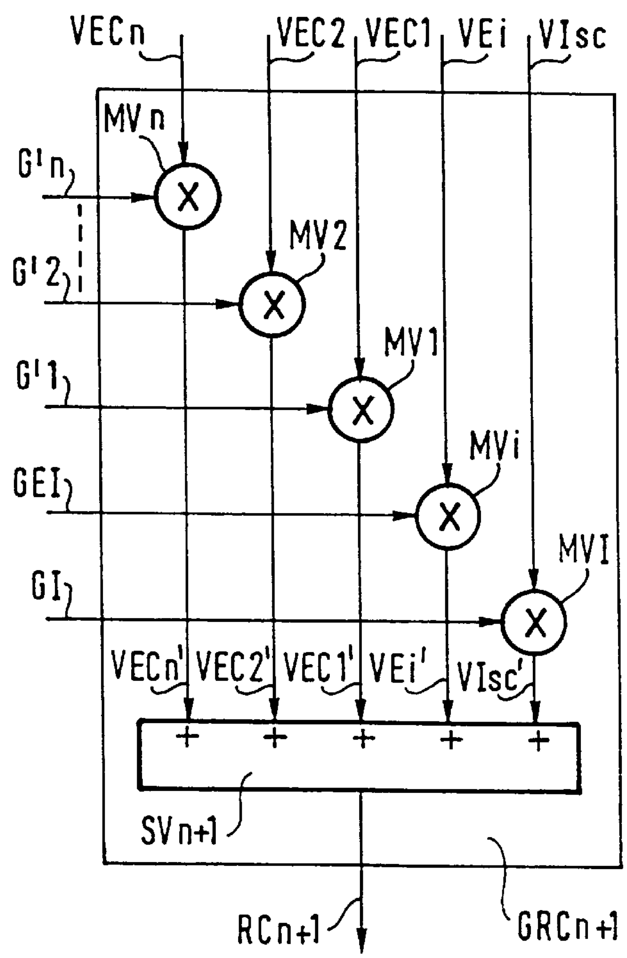
FIG. 6 shows an embodiment of the ON-time control circuit GRCn+1 shown in FIG. 4.

Specifically, the difference signals considered are applied to a mark or ON-time control circuit GRCn+1, which, as its name suggests, controls the ON-time, i.e. the operation of a cell of the converter, the cell in question in this example being the switching cell of rank n+1 which is not associated with a capacitor, and, through this cell, the control circuit controls the ON-time of all of the cells in the converter. The ON-time control circuit is shown in more detail in FIG. 6.

Figure 7:
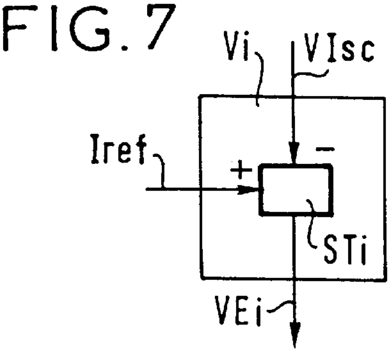
FIG. 7 shows an embodiment of the circuit VI shown in FIG. 4 for measuring difference in the current through the current source.

Prior to describing said ON-time control circuit, it is more appropriate to give consideration firstly to a circuit VI for measuring difference in the current through the current source, which circuit is shown in more detail in FIG. 7. This circuit is coupled to the circuit of the current source SC in a manner such that it is able to receive a representation VIsc of the current I through the current source SC. It also receives a control magnitude Iref defining what the current through the current source SC ought to be. These two values are compared in a subtractor STi which produces a signal VEi, e.g. a voltage, representative of the difference between the observed value of the charge current and its control value. This signal is also delivered to the ON-time control circuit GRCn+1.

The ON-time control circuit GRCn+1 also receives, directly, the representation VIsc of the current through the current source.

Returning to FIG. 6, but also to FIG. 4, it can be seen that the ON-time control circuit GRCn+1 also receives magnitudes G'n . . . , G'2, G'1, GEI and GI by which the signals VECn . . . , VEC2, VEC1, VEi, VIsc are multiplied by means of multipliers MVn . . . , MV2, MV1, MVi, MVI, so as to deliver weighted signals VECn' . . . , VEC2', VEC1', VEi', VIsc' which are applied to a summing circuit SVn+1 delivering the control signal RCn+1 for controlling the switching cell of rank n+1. More precisely, the value of the control signal RCn+1 is converted, in a control module GSn+1, into a signal for controlling the cell CTn+1, which signal has a duration that is a direct function of the value of the control signal, and puts the switching cell of rank n+1 in said first conduction state.

As already mentioned above, and as explained in more detail below, the same signal also determines the duration of said first conduction state in the other switching cells of the converter by cascade action between the control circuits GRCn . . . , GRC2, GRC1 respectively associated with the capacitors Cn . . . , C2, C1.

Figure 8:
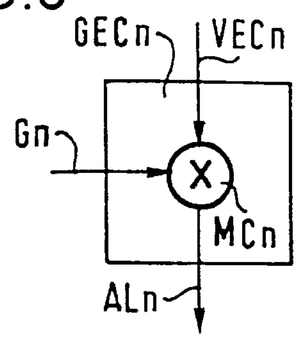
FIG. 8 shows an embodiment of the weighting module GECn shown in FIG. 4.

Furthermore, the difference signals VECn . . . , VEC2, VEC1 are individually applied to weighting modules GECn . . . , GEC2, GEC1 also receiving weighting parameters Gn . . . , G2, G1 and which deliver weighted signals ALn . . . , AL2, AL1. By way of example, FIG. 8 shows the module GECn which merely contains a multiplier MCn for multiplying the difference signal VEcn by the corresponding weighting parameter Gn. The other weighting modules are similar.

Figure 9:
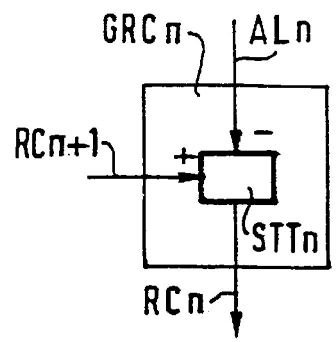
FIG. 9 shows an embodiment of the ON-time control circuit GRCn shown in FIG. 4.

The weighted signals ALn . . . , AL2, AL1 are respectively applied to ON-time control circuits GRCn . . . , GRC2, GRC1 which also receive respective transfer signals RCn+1 . . . , RC3, RC2 and produce respective control signals RCn . . . , RC2, RC1 for controlling the successive switching cells of the converter. More precisely, the control signals are applied to control modules Gsn . . . , GS2, GS1 organized to control the duration of said first conduction state, as defined above, of the switching cells of rank n . . . , 2, 1. By way of example, FIG. 9 shows the ON-time control circuit GRCn. It receives the weighted signal ALn and, as transfer signal, the control signal RCn+1 for controlling the preceding cell of the converter. It comprises a summing circuit STTn subtracting the weighted signal ALn from the transfer signal RCn+1, so as to deliver the control signal RCn. The ON-time control circuits GRCn−1 (not shown), GRC2, and GRC1 are similar, the circuit GRCn−1 receiving the control signal RCn as transfer signal, the circuit GRC2 similarly receiving a control signal RC3, and the circuit GRC1 similarly receiving the control signal RC2.

Overall operation of the control means shown in FIG. 4 is described below.

The control modules GSn+1, GSn . . . , GS2, GS1 operate in response to trigger signals Sd1, Sd2, . . . , Sdn, Sdn+1 which are delivered to them on each period such as p1 (FIG. 3) by a time base BT, followed by unit delay modules T, in offset manner so as to control the switching cells of the converter in offset manner, during a repeated operating cycle of the multilevel converter subdivided into n+1 equal fractions.

On each pulse from the time base, a control module delivers a cell control signal putting said switches of the cell in said first conduction state. During an operating cycle of the converter, this takes place successively in the control modules GS1, GS2 . . . , GSn, GSn+1. For each cell, the duration of said first conduction state, and thus of the cell control signal that generates it, is a function of the value of the control signal that is received by the control module associated with the cell.

The value of the control signal RCn+1 depends in additive manner (see FIG. 6) on the current I through the current source SC, on the difference VEi between the value of the current I and a control magnitude Iref, and on the differences in the charge voltages of the capacitors of the converter VEC1, VEC2 . . . , VECn, each of the values being assigned an adjustment parameter that is in the form of a gain and that determines the weight of its contribution to the sum that produces the control signal RCn+1. Acting on these parameters makes it possible to adjust operation of the converter, and in particular determines the response times for responding to the variations and differences taken into account in this way.

It is initially assumed that none of the above differences appears, and that a current is established through the current source SC. The control signal RCn+1 is thus formed of the signal VIsc' only, representing the amplitude of the current. It is applied directly to the control module GSn+1 and, as transfer signal, to the ON-time control circuit GRCn. The ON-time control circuit GRCn (see FIG. 9) subtracts from the signal RCn+1 the weighted signal ALn which comes from any difference in the charge voltage of the capacitor Cn. Since it is assumed that such a difference does not exist, the control signal RCn is thus equal to the control signal RCn+1. The control signal RCn is used to control the switches of the cell of rank n and is used as transfer signal by an ON-time control circuit GRCn−1 (not shown) similar to the circuit GRCn described above. Since it is also assumed that the capacitor Cn−1 (not shown) shows no voltage difference, operation of the ON-time control circuit GRCn−1 is the same as described above, and so on. In particular, the ON-time control circuit GRC2 thus also receives a transfer signal RC3 also equal to the signal RCn+1, and delivers a control signal RC2 of the same value, serving as transfer signal for the ON-time control circuit GRC1 which delivers the control signal RC1.

Assuming that all of the capacitors of the converter are at their nominal charge voltage, and that the current through the current source is as indicated by the reference signal Iref, it can be seen that the converter operates in stable manner, the duration of said first conduction state being the same in all of the cells and remaining constant.

Figure 3:
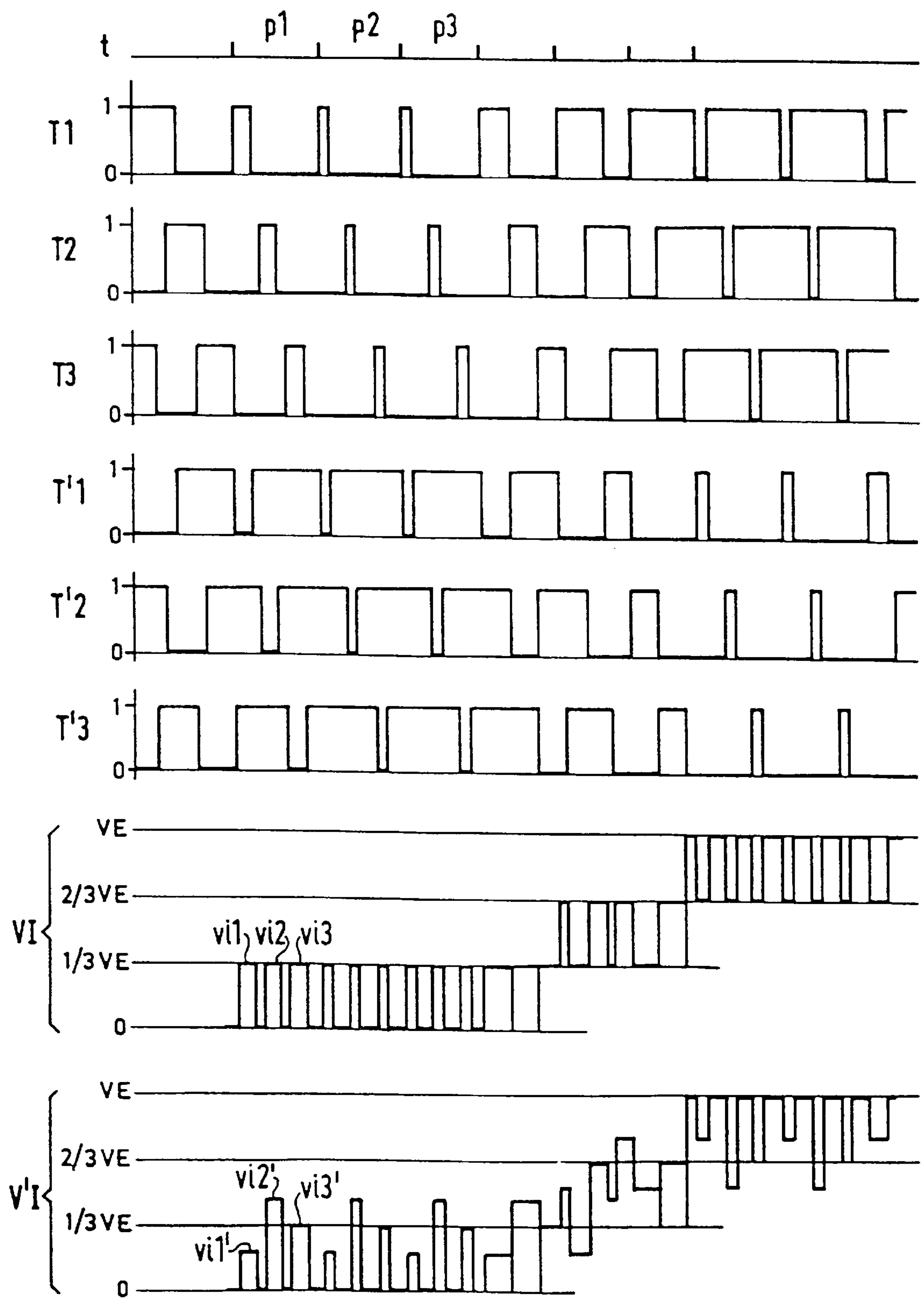
FIG. 3, described above, is a waveform diagram showing operation of the multilevel converter of FIGS. 1 and 2, for the case where it comprises three stages.

It is assumed below that the converter must deliver a voltage that is sinusoidal in appearance as shown in FIG. 3. The control magnitude Iref is then altered by control means (not shown), converter period after converter period. Its amplitude decreases, then increases, in the manner of the durations of the pluses in line T1 of FIG. 3. The amplitude of the control signal RCn+1 varies accordingly.

As explained above, the control signal RCn+1 is delivered to the ON-time control circuit GRCn (not shown) as transfer signal, and is included in the control signal RCn . . . , until the last ON-time control circuit GRC1, so as to be included in the control signal RC1. It is thus the operating rate of the converter as a whole which is altered by the action on the control magnitude Iref, and the operating mode shown in FIG. 3 is obtained.

Naturally, the action on the magnitude Iref makes it possible to obtain any desired waveform for the output current of the converter.

Also naturally, any spontaneous change in the current through the current source SC, with the control magnitude Iref remaining unchanged, produces a change in the control signals of the cells of the converter tending cause said spontaneous change to disappear.

It can be noted that such actions, involving a change in the duration of said first conduction state in the cells of the converter only require an action time of about one converter period, i.e. a very short time.

Moreover, if the charge on the capacitors of the converter is altered collectively by a controlled or spontaneous variation in the current through the current source SC, the sum of the voltage differences shown by the signals VECn . . . VEC1 appears in the value of the control signal RCn+1, after intervention from the weighting parameters G'n . . . G'1. Thus, it results in a collective action, as explained above, on all of the cells of the converter. This reinforces the dynamics of controlling and regulating the ON-time of the converter.

It is assumed below that one of the capacitors of the converter, e.g. C2, has departed from its nominal charge voltage. This results in a non-zero difference signal VEC2. The corresponding quantity, after weighting by the parameter G'2, modifies the control signal RCn+1 accordingly. As explained above, the control signals of all the cells of the converter are altered accordingly.

Furthermore, the difference signal VEC2 is applied to the weighting module GEC2, where, multiplied by the weighting parameter G2, it forms the weighted signal AL2. In the ON-time control circuit GRC2, the weighted signal AL2 is subtracted from the transfer signal RC3. The parameters G'2 and G2 are such that the result, in the control signal RC2, is corrective action as explained at the beginning of this text, tending to return the charge on the capacitor C2 to its nominal value. Collectively controlling the cells of the converter further makes it possible to improve the dynamics of returning the converter to normal.

Figure 2:
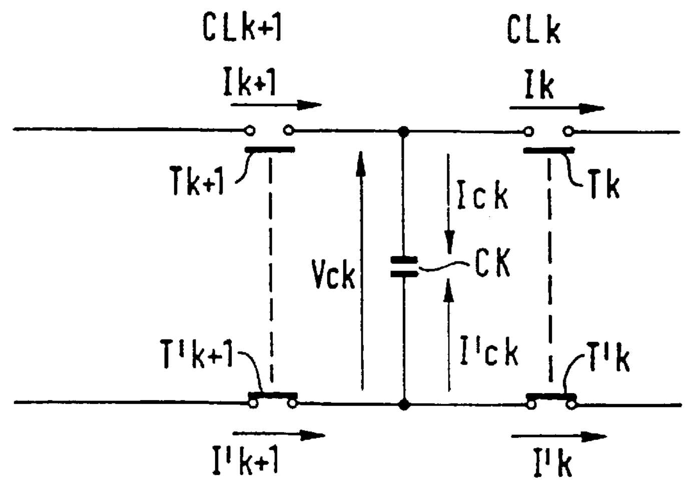
FIG. 2, described above, is the circuit diagram of a set of two imbricated stages of the multilevel converter of FIG. 1.

In addition, the control signal RC2 is transmitted to the ON-time control circuit GRC1 as transfer signal; this makes it possible to compensate for the action on the capacitor C1 which accompanies the action on the capacitor C2, as explained with reference to FIG. 2, with an action in the opposite direction on the capacitor C1.

Finally, as indicated above, the various gains used in the characteristic weighting values of converter operation determine the dynamics, i.e. the response time required by the converter to respond to spontaneous variations in the characteristic values.

The gains must also naturally take account of the dimensioning of the converter.

In a preferred embodiment, the various gains can be expressed as follows:

$$G1 = \frac{-C1 * \rho 1}{Isc_0}$$

$$G2 = \frac{-C2 * \rho 2}{Isc_0}$$

$$\ldots$$

$$Gn = \frac{-Cn * \rho n}{Isc_0}$$

$$G'1 = \frac{-C1 * \rho 1 * Vc1_0}{VE * Isc_0}$$

$$G'2 = \frac{-C1 * \rho 2 * Vc2_0}{VE * Isc_0}$$

$$\ldots$$

$$G'n = \frac{-Cn * \rho n * Vcn_0}{VE * Isc_0}$$

$$GEI = \frac{-Lsc * \rho n + 1}{VE}$$

$$GI = \frac{Rsc}{VE}$$

In these expressions, C1, C2, Cn are the capacitances of the capacitors having the same designations, $Vc1_0$, $Vc2_0$ . . . , $Vcn_0$ are the nominal voltages across the terminals of the same capacitors, $Isc_0$ is the nominal current through the current source SC, Lsc is its inductance, and Rsc its resistance, VE is the voltage of the voltage source, and ρ1, ρ2 . . . , ρn, ρn+1 are gains attached to the cells of ranks 1, 2 . . . , n, n+1. These gains are calculated so as to perform decoupling between said characteristic values making up said combined set.

We claim:

1. A multilevel converter comprising, in particular, between a voltage source and a current source, a succession of controllable switching cells, each having two switches, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell being connected to said current source, while the pair of downstream poles of a last cell is connected to said voltage source, the converter also comprising a respective capacitor for each cell, except that the capacitor of the last cell may be omitted when said voltage source is suitable for performing the same role, each capacitor being connected between the two poles constituting the pair of downstream poles of its cell, the converter also comprising control means governing the nominal operation of the converter and acting on the switches of the successive cells in such a manner that the two switches of any one cell are always in respective opposite conduction states, such that in response to a cell control signal delivered by said control means, one of the two switches in a given cell is successively in a first conduction state and then in a second conduction state during a cyclically repeated converter period, and such that in response to cell control signals that are identical but offset in time by a fraction of said period, the switches of successive cells function respectively in the same manner but offset in time by said fraction of a period, the successive capacitors having respective increasing nominal mean charge voltages, the nominal mean charge voltage of the capacitor in each of said cells being equal to the product of a voltage from said voltage source multiplied by the reciprocal of the number of cells and by the rank of the cell, the converter including collective control means for taking into account a combined set of weighted values, each of which relates to a characteristic value of operation of the converter, the combined set collectively controlling ON-time control means suitable for altering accordingly a duration of the first conduction state of all of the cells of the converter in a direction suitable for reaching a state of dynamic equilibrium.

2. A multilevel converter according to claim 1, wherein said collective control means include means for evaluating any current difference between an observed current through said current source and a current assigned to said current source, said difference being included in said combined set.

3. A multilevel converter according to claim 1, wherein said combined set also takes into account the sum of said voltage differences, if there are any.

4. A multilevel converter according to claim 1, wherein said ON-time control means comprise an ON-time control circuit delivering a control signal to a cell control module which delivers a cell control signal by means of which it modulates accordingly said duration of the first conduction state of the first cell of the converter.

5. A multilevel converter according to claim 4, wherein said first cell is the cell adjacent to the voltage source.

6. A multilevel converter according to claim 4, wherein said ON-time control means comprise an ON-time control circuit for each of the cells following said first cell, and wherein each of the ON-time control circuits is connected to a cell control module, and the ON-time control circuits are connected together in a manner such that the ON-time control circuit of a given cell receives the cell control signal of a cell preceding the given cell, and uses it, together with said voltage difference of the given cell, to generate the control signal for controlling the given cell.

7. A multilevel converter according to claim 1, wherein said current difference and/or said voltage differences can be weighted by an adjustable gain parameter, so as to perform decoupling between said characteristic values making up said combined set.

* * * * *